United States Patent [19]

Dellinger et al.

[11] Patent Number: 4,686,657

[45] Date of Patent: Aug. 11, 1987

[54] MATCHING P WAVE AND SHEAR WAVE SECTIONS IN SEISMIC EXPLORATION

[75] Inventors: J. A. Dellinger; Neal R. Goins; Theresa A. Reilly, all of Dallas, Tex.

[73] Assignee: Mobil Oil Corporation, New York, N.Y.

[21] Appl. No.: 688,656

[22] Filed: Jan. 3, 1985

Related U.S. Application Data

[63] Continuation-in-part of Ser. No. 653,616, Sep. 24, 1984, abandoned.

[51] Int. Cl.$^4$ ............................................. G01V 1/36
[52] U.S. Cl. .................................... 367/75; 367/40; 364/421
[58] Field of Search .......................... 367/31, 40, 75; 364/421, 422

[56] References Cited

U.S. PATENT DOCUMENTS 4,422,165  12/1983  Thomas et al. ...................... 367/75

OTHER PUBLICATIONS

Forney, Jr., "The Veterbi Algorithm", *Proc. IEEE*, vol. 26, #3, 3/73, pp. 268-278.
"Fluid Saturation Effects on Dynamic Elastic Properties of Sedimentary Rocks", Geophysics, vol. 41, No. 5, pp. 895-921, Oct. 1976.
"Acoustic Character Logs and Their Application to Formation Evaluation", Journal of Petroleum Technology, Jun. 1963.

*Primary Examiner*—Thomas H. Tarcza
*Assistant Examiner*—Ian J. Lobo
*Attorney, Agent, or Firm*—Alexander J. McKillop; Michael G. Gilman; George W. Hager, Jr.

[57] ABSTRACT

In seismic exploration, the ratio of the velocities of compressional and shear wave data is automatically determined by cross-correlating a compressional wave trace against a window of the shear wave trace to produce a set of correlation coefficients as a function of P wave time. The shear wave window is shifted by an increment of time. The steps of cross-correlating and shifting the window are repeated to form a grid of correlation coefficients. Points on the grid represent the correlation coefficients between a point on one trace and a point on the other trace. The path of maximum correlation coefficients, or maximum likelihood functions, through the grid identifies the $V_p/V_s$ profile. This path is selected by a process which includes selecting the best path between two points and then increasing the number of points in the sequence until the best path through the grid is determined.

20 Claims, 10 Drawing Figures

MATCHING P WAVE AND SHEAR WAVE SECTIONS IN SEISMIC EXPLORATION

This application is a continuation-in-part of application Ser. No. 653,616, filed Sept. 24, 1984, now abandoned.

BACKGROUND OF THE INVENTION

This invention relates to matching P wave and S wave seismograms and more particularly, to determining the ratio of the velocities of compressional and shear waves in seismic exploration.

Seismic energy propagates in a compressional, or P wave, and in a shear, or S wave, mode. Compressional and shear waves travel at different velocities through the earth and ratio of these velocities, $V_p/V_s$, is a characteristic of the formations through which the waves propagate.

The ratio of the velocities of the P waves and the S waves indicates the composition of the subsurface layers if sufficiently accurate measurements of the $V_p/V_s$ ratio can be made. See Gregory, A. R., "Fluid Saturation Effects on Dynamic Elastic Properties of Sedimentary Rocks", *Geophysics*, Vol. 41, No. 5, pp. 895–921, October, 1976; and Pickett, G. R., "Acoustic Character Logs and Their Application to Formation Evaluation", *Journal of Petroleum Technology*, June, 1963.

Frequently, it is important for the interpreter to consider a P wave and an S wave seismic section together. In order to do this, a match (usually referred to as a correlation) must be made between the same points on the two sections. It is necessary to locate the same coal seam, or gas pocket, for example, on both sections. This matching (correlation) has generally, in the past, been performed by interpreters in a time consuming manner. Further, the results are usually unsubstantiated unless actual well logs are available to aid in the correlation.

It is an object of the present invention to automatically match, or correlate, events in P wave and S wave seismic sections.

One way of performing this correlation would be to directly map every seismic event from one section to the other. Using starting points on the P wave and S wave traces, each deviation on the P wave trace would be matched with one on the S wave trace by stretching or compressing the S wave trace to fit. This assumes that the seismograms are ideal. In reality, sizable events may be recorded on one trace that are small or completely missing on the other. Because of this, the automated matching of S wave and P wave sections has in the past been computer intensive and subject to becoming "lost" in portions of the traces wherein seismic events appear on one trace, but not in the other.

SUMMARY OF THE INVENTION

In accordance with the present invention, events on compressional and shear wave seismic sections are automatically correlated. In carrying out the invention, a window of a compressional trace is cross-correlated against a window of the corresponding shear wave trace to produce a set of correlation coefficients as a function of time, for example, S wave time. Then, one of the windows, for example the P wave window, is shifted by an increment of time and the cross-correlation operation is repeated. The cross-correlation and time shifting are repeated to form a grid of cross-correlation coefficients. The grid includes one set of correlation coefficients as a function of S wave time for each of the increments of P wave time. On this grid, the correlation coefficient at any point represents the correlation between a point on the P wave trace and a point on the S wave trace.

A path through this grid represents the $V_p/V_s$ ratio. The correct path, generally the path with the highest cross-correlation coefficients, represents the correct $V_p/V_s$ ratio. In order to select the correct path, a likelihood function is established which represents the correlation coefficients at the points along the paths. The likelihood function also represents the most likely ratios of compressional and shear wave velocities and it represents the smoothness of the path through the grids.

In accordance with the invention, the path having the maximum likelihood function is selected as indicating the correct ratio of the velocities of the compressional and shear waves. In order to do this, the likelihood function for each sequence of two points in the grid is determined along a plurality of different paths. Then, sequences having high likelihood functions are selected. From these, the best likelihood functions for the next sequences of three points along different paths are selected. The process is repeated until a selected number of most likely paths through the grid are produced as outputs.

The profile, or slope, of the path having the maximum likelihood function identifies the correct $V_p/V_s$ ratio through the subsurface under investigation. This ratio is used to stretch or compress the seismic section as appropriate to match (correlate) events on a compressional wave section with events on a P wave section.

The method of the present invention has the advantage of trying all reasonable matches between P wave and S wave seismograms. It has the additional advantage of being able to correct itself if it becomes "lost" due to the absence of similar events in portions of the P wave and S wave traces. Another advantage is that more than one possible match is produced as outputs for each run. This output generally contains the correct match, but the user can make the selection of the best match based on extraneous information which he may have. The present invention also has the advantage that the user can input to the process known information about correspondences between horizons, correct range of $V_p/V_s$ ratios, and the like, all of which may eliminate undesirable matches.

The foregoing and other objects, features and advantages of the invention will be better understood from the following more detailed description and appended claims.

SHORT DESCRIPTION OF THE DRAWINGS

Figure 3:
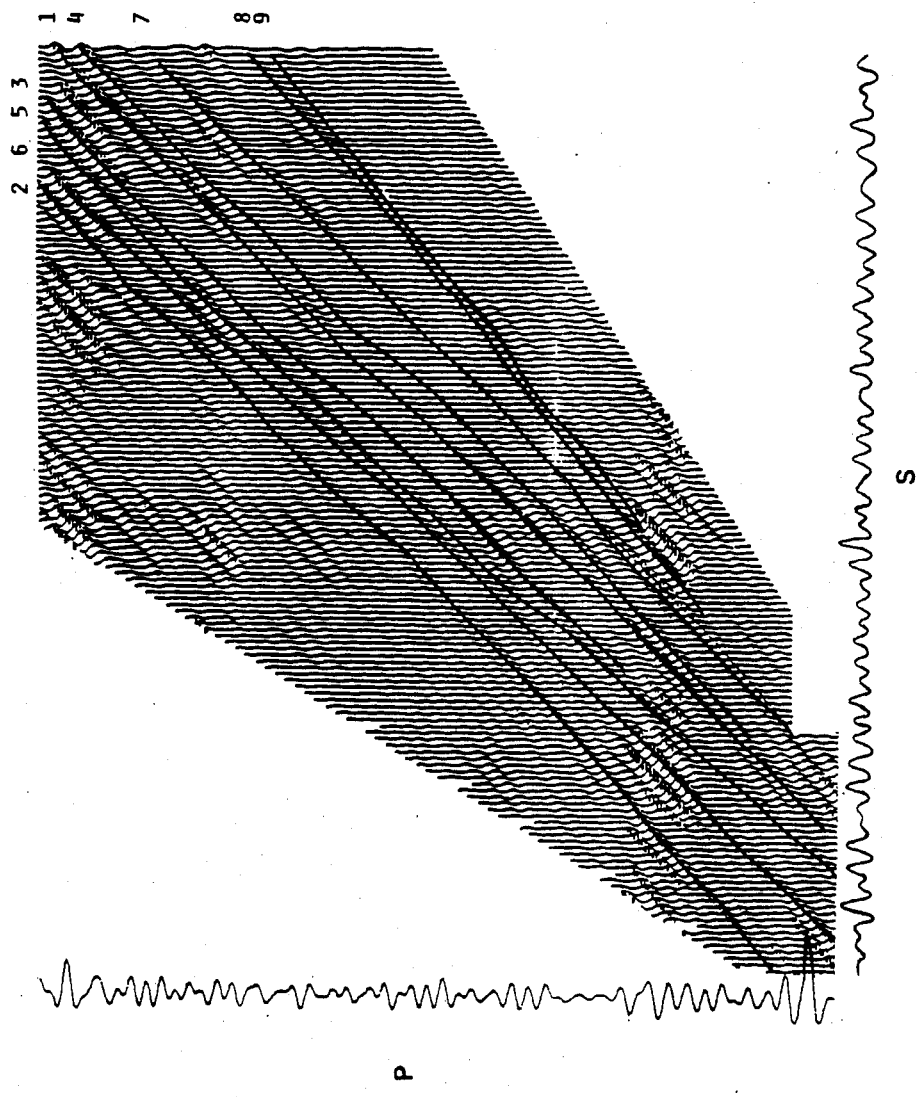
FIG. 3 shows a grid with nine likely paths which have high likelihood coefficients.
Figure 4:
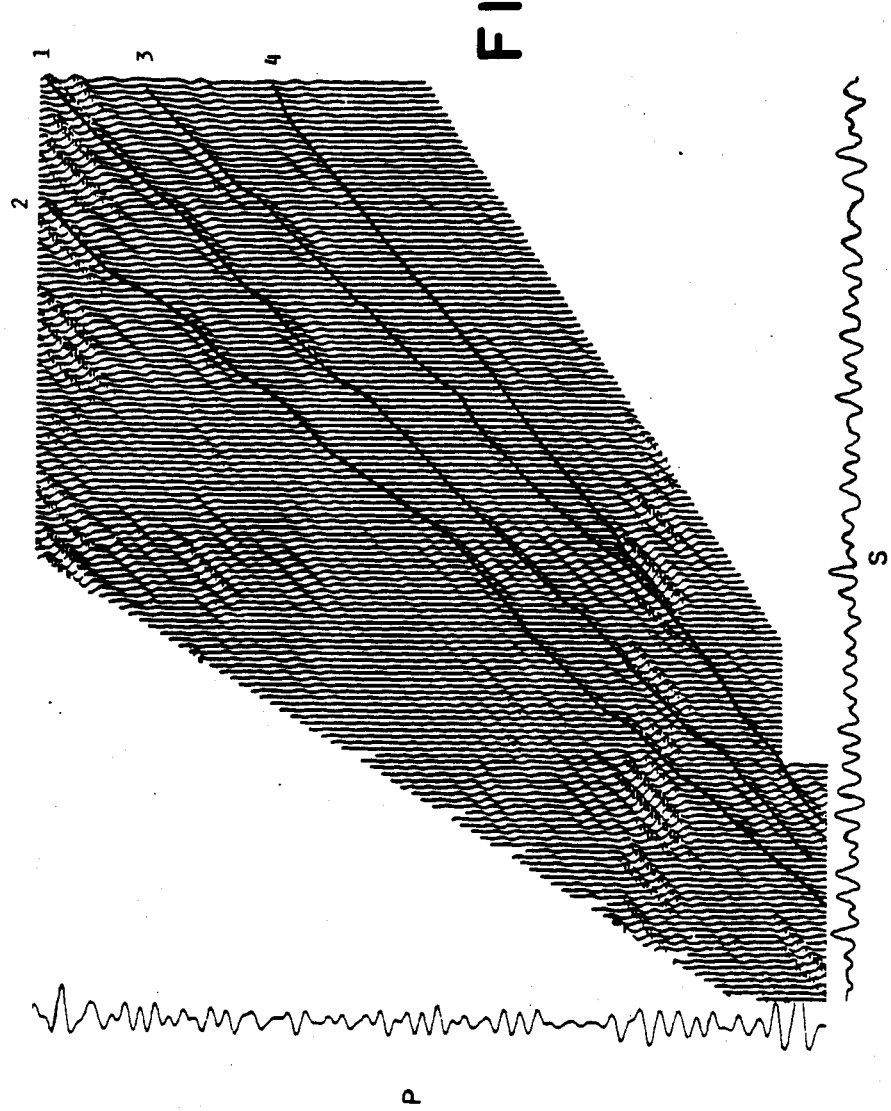
Figure 5:
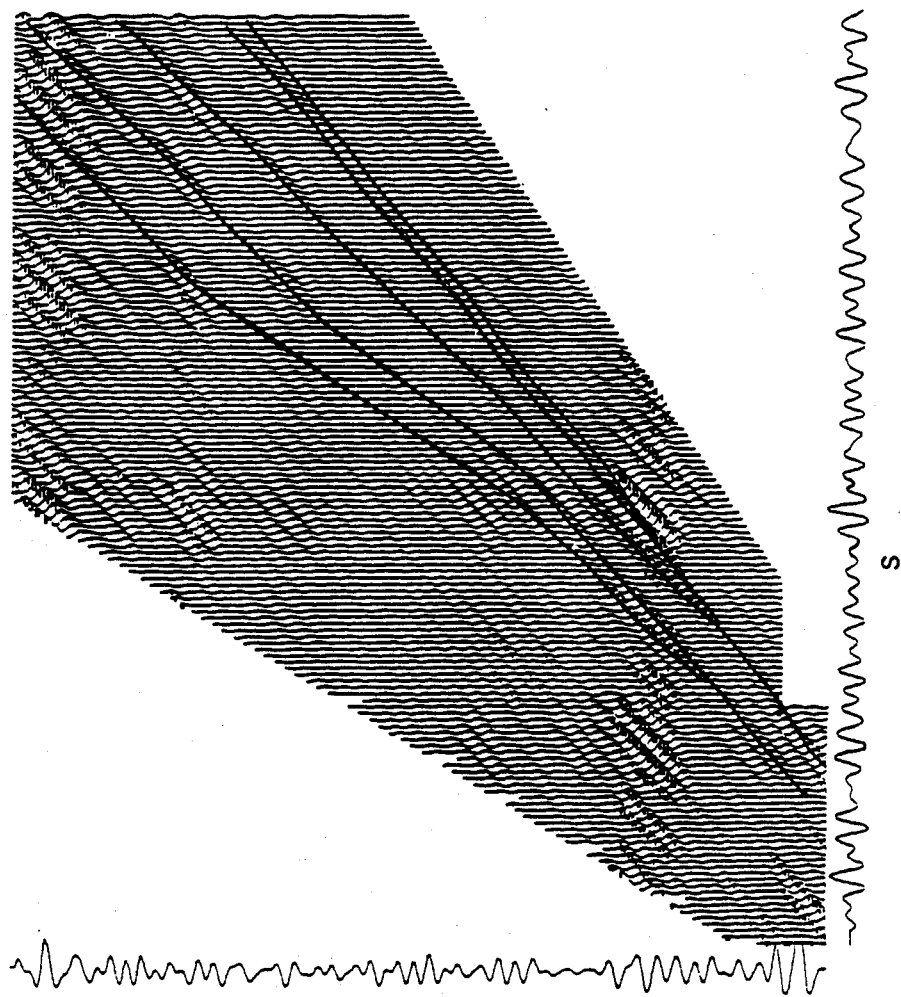
Figure 6:
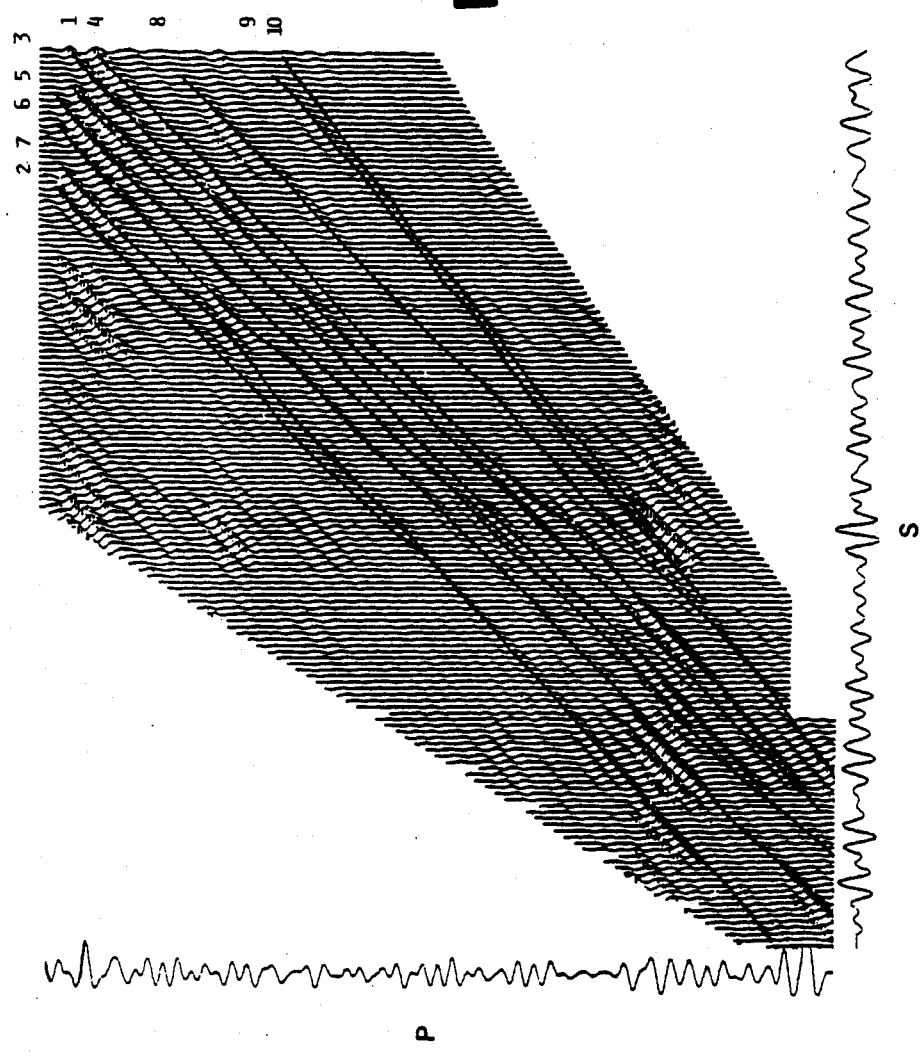
Figure 7:
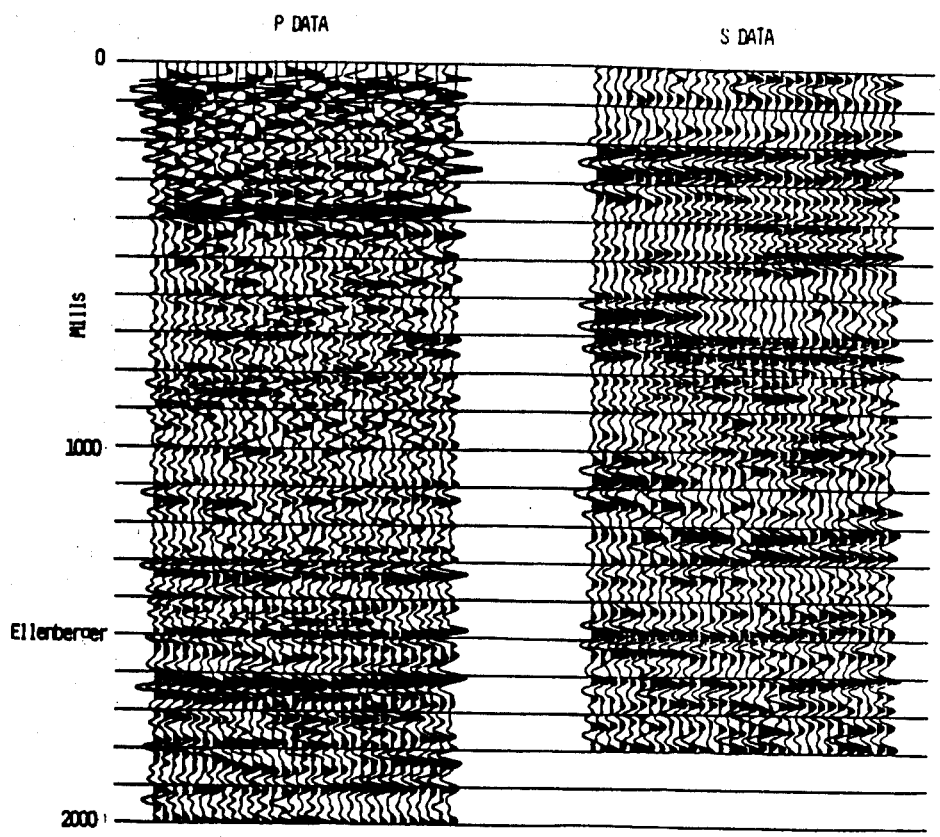
Figure 8:
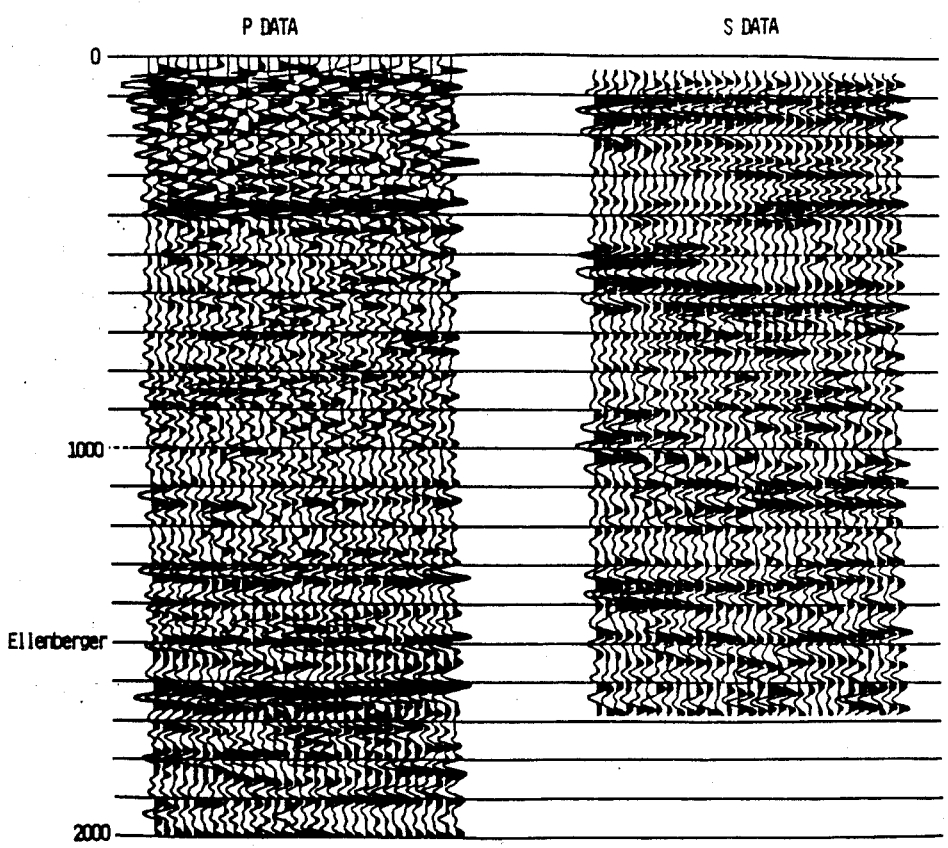
Figure 9:
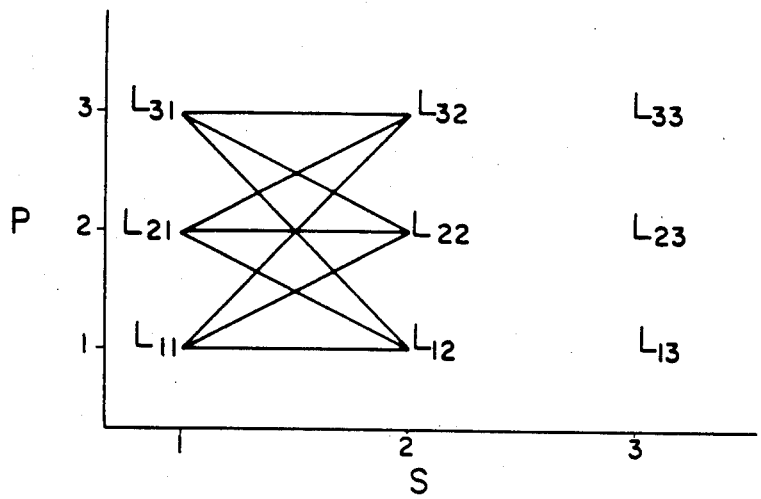
Figure 10:
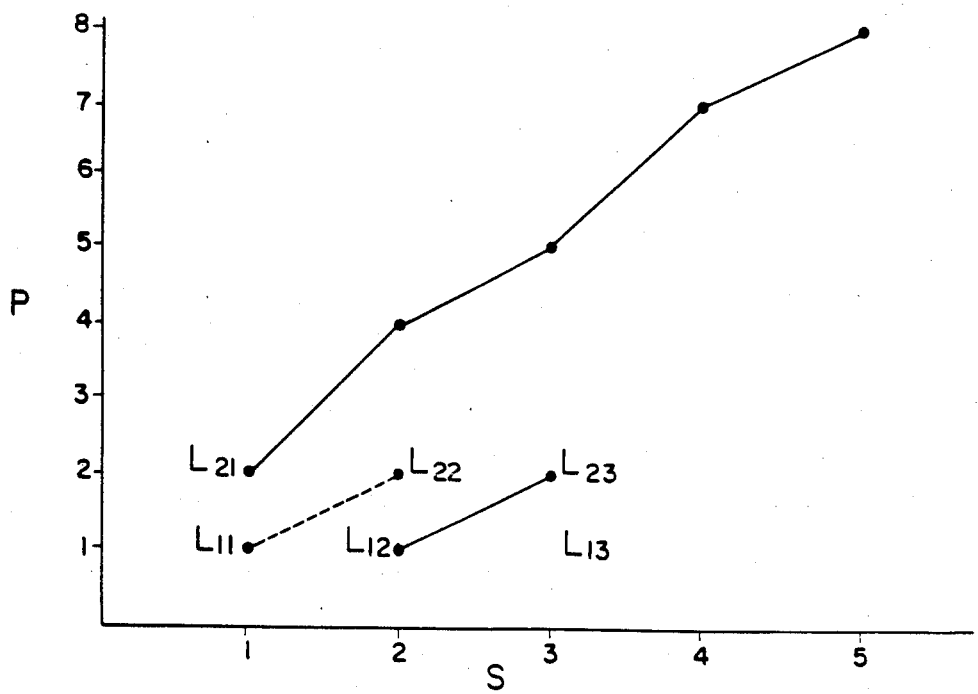

FIGS. 4, 5, and 6 show the same grid as FIG. 3, but with different likelihood functions used to evaluate the paths;

FIG. 7 shows a P and an S wave section with the events matched in accordance with a manual interpretation based on well logs;

FIG. 8 shows the same sections as FIG. 7, but with events matched in accordance with the procedure of the present invention; and FIGS. 9 and 10 depict paths and sequences of paths in the correlation grid.

DESCRIPTION OF THE PREFERRED EMBODIMENT

Figure 1:
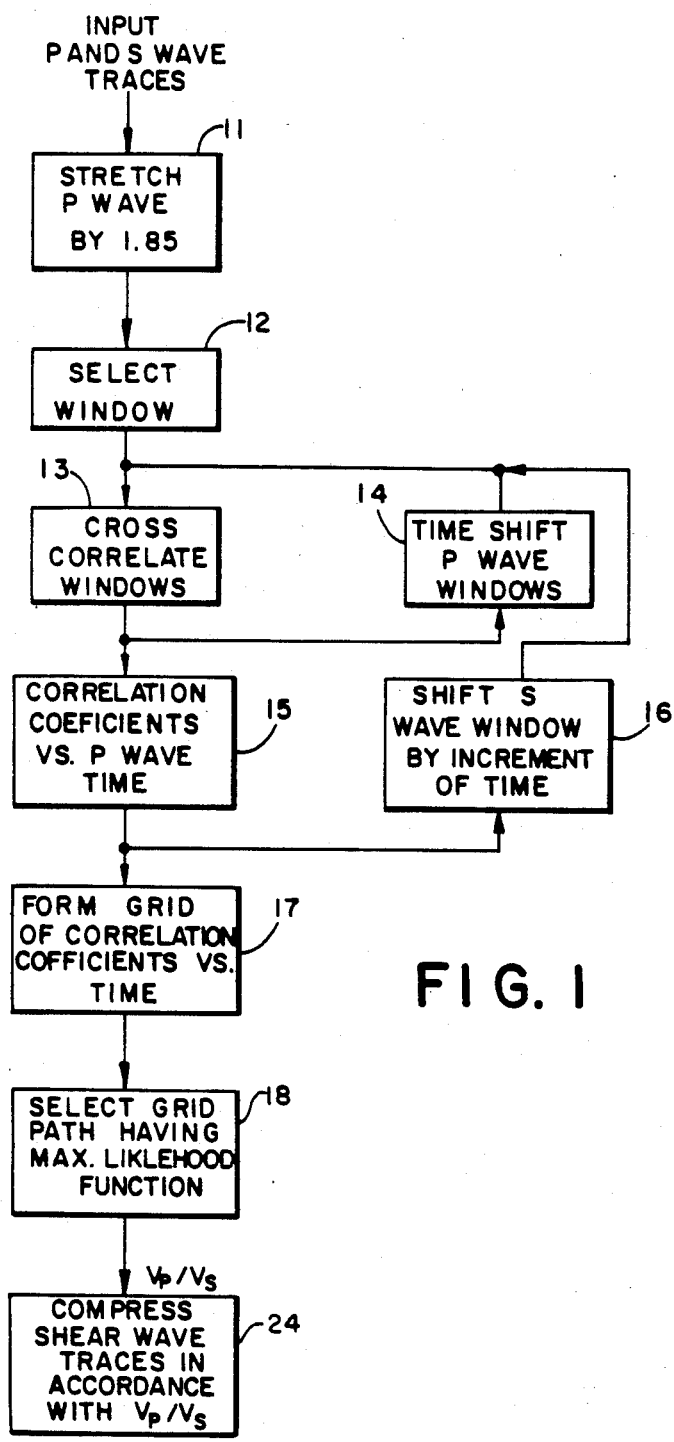
FIG. 1 is a flow chart of the method of the present invention.

Referring to FIG. 1, compressional and shear wave traces representing the reflections of shear wave and compressional wave seismic energy reflected from subsurface formations are provided as in input to the process.

As indicated at 11, points on the P wave traces are stretched by 1.85 in order to compensate for differences in average shear and compressional wave velocities.

Cross-correlation is performed by taking a window in the S wave trace and sliding the window down the P wave traces. The step of selecting windows in the S wave trace and in the P wave trace is indicated at 12. These windows are cross-correlated as indicated at 13. By time shifting the P wave window as indicated at 14, the aforementioned effect of sliding the S wave window down the P wave trace is obtained. The result of cross-correlation step 13 and shifting P wave time 14 is a set of cross-correlation coefficients as a function of P wave time, as indicated at 15. This set forms one column in a grid which is formed as indicated at 17.

The window in the S trace is then time shifted by one increment of time as indicated at 16 and the process is repeated to form another set of correlation coefficients as a function of P wave time. The result is a two dimensional grid of cross-correlations in which the correct correlations should stand out as an unbroken string of peaks. Unfortunately, while cross-correlation does result in a reasonably consistent string of peaks, there are usually many sets of peaks in the cross-correlation functions.

FIG. 3 depicts the two dimensional grid of correlation coefficients versus time, produced in accordance with step 17. Shown along the bottom is the S wave trace, while along the left hand side is the P wave trace. A correlation between a point on one trace, and a point on the other is represented by a point on this grid. In FIG. 3, each column of the grid represents a set of correlation coefficients versus P wave time. Each column has been plotted like a "wiggle" trace wherein a high peak represents a good cross-correlation and a trough represents a small correlation. The lines cutting across the vertical traces are paths, each of which represent different profiles of ratios of compressional and shear wave data. (As a simple example illustrating this, a straight line originating at the lower left hand corner of the grid and having a slope of 45° would represent a $V_p/V_s$ ratio of 1 because all points on the line would represent the same time on the shear wave and S wave trace and hence, the same velocity. This example assumes that time on the two traces is equal; there has been no stretching.)

One way to determine the correct $V_p/V_s$ profile would be to evaluate the cross-correlation coefficients along all possible paths through the grid, and to select the path having the maximum cross-correlation coefficients as the one identifying the correct $V_p/V_s$ profile. This requires a great deal of computer time.

In order to select the proper path, a likelihood function is determined along each of a number of different paths. The likelihood function represents the correlation coefficients at the points along each of the paths. The likelihood function has two other characteristics besides favoring points which have a high correlation function. The likelihood function favors likely $V_p/V_s$ ratios, and it favors smooth transitions from one point to another.

The step of selecting the grid path which identifies the correct $V_p/V_s$ profile is indicated at 18 in FIG. 1. This subroutine is shown in more detail in FIG. 2. The technique of selecting the best sequence is an adaptation of a procedure devised by Viterbi and described, for example, in "The Viterbi Algorithm", Formey, Jr., *Proc. of the IEEE*, Vol. 26, No. 3, March 1973, p. 268.

The procedure can best be illustrated by a simple example with reference to FIGS. 9 and 10. FIG. 9 depicts a small portion of the grid of cross-correlation functions wherein 1, 2, 3 . . . along the abscissa represent increments of S wave time and 1, 2, 3 . . . along the ordinate represent increments of P wave time. The coordinate points are the likelihood functions for each of the corresponding s and P wave times. That is, $L_{11}$ represents the likelihood function at S wave time of 1 and a P wave time of 1. This likelihood function includes the cross-correlation coefficient, the likelihood of the point being on the correct $V_p/V_s$ profile, and the smoothness of the path. The object is to find the path through the grid intersecting the points with the highest likelihood functions. In order to simplify this example, assume that the likelihood function is only the correlation coefficient, which can vary between +1.0 and −1.0. For this example, there are three possible points in each column, 1, 2 and 3; the correlation coefficients for the paths between these points, from one column to another, is presented in the following table:

|  |  | 2nd Column | | |
| --- | --- | --- | --- | --- |
|  |  | 1,2 | 2,2 | 3,2 |
| 1st Column | 1,1 | .25 | .75 | 0 |
|  | 2,1 | 0 | 0 | 1.0 |
|  | 3,1 | .33 | .67 | 0 |

The foregoing table shows that the product (or sum) of the cross-correlation coefficients for the points 1,1 and 1,2 is 0.25. Stated another way, the cross-correlation coefficients (or likelihood functions) encountered in the path from 1,1 to 1,2 is 0.25. The path from 2,1 to 1,2 has a coefficient of 0; the path from 3,1 to 1,2 has a correlation coefficient of 0.33 and so on. In all, there are nine different paths from the first column in FIG. 9 to the second column in FIG. 9 and these paths have been shown. Extending this to the third column, there are 27 different paths through the points on the grid of FIG. 9.

One way of finding the best path of some arbitrary length would be to construct all possible paths of the length and simply choose the path whose correlation coefficients (likelihood functions) turn out to be the highest. Clearly, even for such a simple problem the computer time incurred by this exhaustive search methodology would become prohibitive. However, since we are interested in knowing the correlation coefficients for only the most likely solutions, a considerably simpler and more efficient method exists.

This method is to construct an optimal string of any arbitrary length N by first determining the optimal string of length 2 for each possible ending value and then using the sequences of length 2 to generate the best sequence of length 3 for every possible ending value, etc. For a sequence of length 2 ending at 1,2, the correlation coefficients (likelihood functions) for the paths starting at 1,1; 2,1 and 3,1 are 0.25, 0.0 and 0.33, respectively. Thus, the path from 3,1 to 1,2 is the most likely sequence of length 2 ending at 1,2. Similarly, for sequences of length 2 ending at 2,2 and 3,3, the paths from 1,1 and 2,1 respectively, are the two most likely complete sequences.

Now consider sequences of length 3. Since the three best sequences of length 2 are known, the problem now is to find which of these sequences will generate optimal sequences of length 3 ending at 1,3; 2,3 and 3,3. As can be seen in the next table, the best sequence 3 long ending at 1,3 is from 2,1 to 3,2; the best ending at 2,3 is from 2,1 to 3,2; and the best one ending at 3,3 is 1,1 to 2,2.

|  | 1,3 | 2,3 | 3,3 |
|---|---|---|---|
| 3,1 to 1,2 | .0825 | .2475 | 0.0 |
| 1,1 to 2,2 | 0.0 | 0.0 | .75 |
| 2,1 to 3,2 | .33 | .67 | 0.0 |

Figure 2:
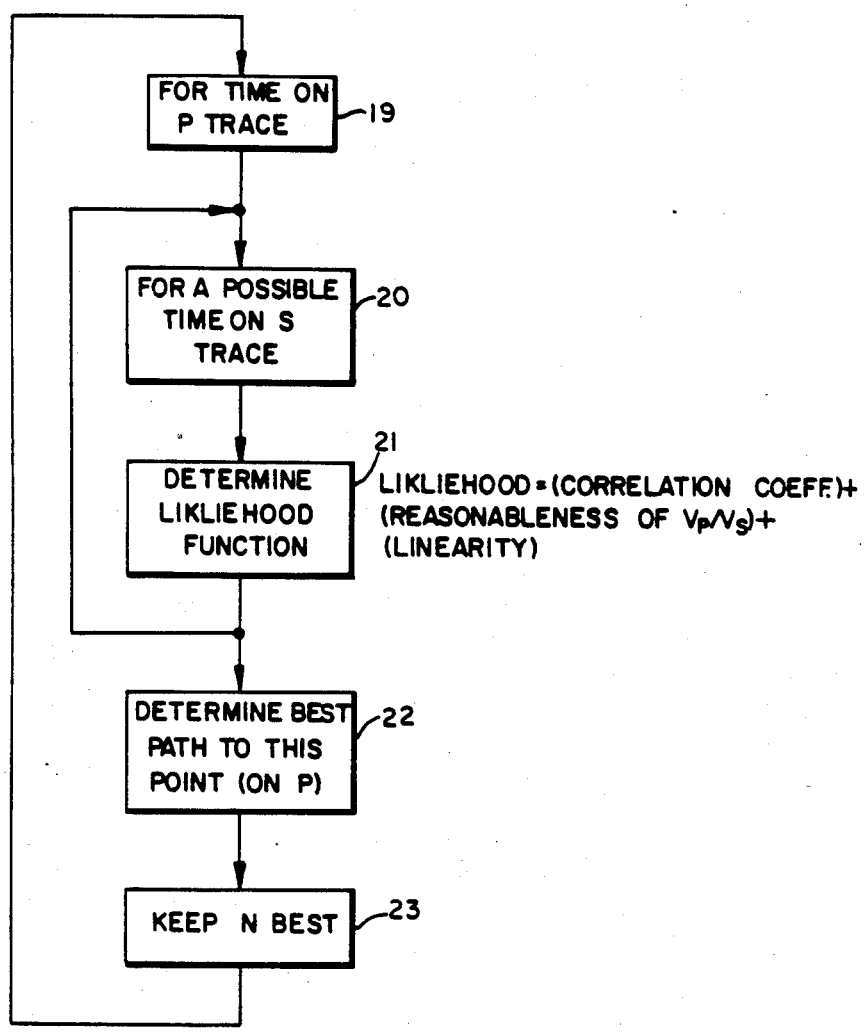
FIG. 2 is a flow chart of the method of selecting the path in the correlation grid having the maximum likelihood function.

The foregoing procedure is applied to finding the best path whose profile represents the correct $V_p/V_s$. The procedure is depicted in FIG. 2. As indicated by the steps 19, 20 and 21, the likelihood function is determined for each time on the P trace and each time on the S wave trace. The likelihood function is based on the cross-correlation coefficients, the reasonableness of the corresponding $V_p/V_s$ value, and the smoothness of the path. From these likelihood functions, the best paths are kept as indicated at 22. In the foregoing simple example, three paths were retained at each iteration, i.e., N=3. In the more detailed example to be given subsequently, 200 paths are retained at each iteration to ensure that all paths do not "dead end", i.e., N=200. The step of retaining the N best paths is indicated at 23. Since several points may pick the same path, it is possible for paths to branch from left to right. However, since any given point can join only the one best path, paths cannot branch from right to left. Points that are not able to join to a path under the constraints of the likelihood function do not start a new path of their own. When some path is not chosen by at least one point during an iteration, that path is discarded. Even so, at least a hundred paths are usually found, most of which are exactly the same as a better path except for an insignificant difference near the bottom of the section. Because of this, paths which have branched off of a better path after some chosen time below any significant reflections on the S trace are discarded as uninteresting.

There are two measurement functions used in the trace correlation process; the correlation function used to generate the two-dimensional grid of correlation coefficients described earlier, and the likelihood function used to evaluate possible paths through this grid. The correlation function is the standard cross-correlation function modified to apply weighting functions which try to align events of equivalent size and place greater importance on large amplitude events than small events. The likelihood function has the following characteristics: it favors points which have a high correlation coefficient, it discourages unlikely $V_p/V_s$ ratios, and local fluctuations in the $V_p/V_s$ ratio are minimized.

Referring again to FIG. 1, the output of the step 18 is an identification of those paths with maximum likelihood functions. In the example of FIG. 3, nine paths have been identified through the matrix, each of which have high likelihood functions. The path marked 1 is the "best" path in terms of maximum likelihood function The $V_p/V_s$ profile identified by this path is used to compress the shear wave traces so that a shear wave section can be directly compared with a P wave section, the step being indicated at 24 in FIG. 1. This will be better understood from the following discussion of a particular computer execution of the invention, and actual examples of its operation, including FIGS. 3-8.

An Exemplary Implementation And Examples Of The Operation Of The Invention

One consideration is the implementation of the "sliding" windows used in cross-correlation. Run-time constraints do not allow both windows to move in small increments, so one window, chosen to be along the P trace is moved in small increments and the other, the one in the S trace, takes larger jumps. Since the P trace window must move in small enough increments to avoid missing peaks in the cross-correlation, the sampling rate of the P trace is used as the sliding window increment. The accuracy of the correlation process is then governed by the size of the increment of the "jumping" window in the S trace, as is program execution time.

Rather than defining a finite number of points in a points sequence as was done in the example, we now define the points to be particular windows on the P trace which correlate with the window on the S trace currently being considered. First, peaks in the cross-correlation are chosen, and then leftovers are placed so as to make the distribution of points as even as possible. The time required to determine likelihood varies with the square of the number of these points. Experience suggests that somewhere between 75 and 250 points is a good compromise. The danger in not allowing enough points is that the correct path may come to a point where there is no way for it to continue under the constraints of the likelihood function, thereby being lost as a possible answer. This problem can be so severe that no possible paths are left, in which case, the program prints an error message, displays paths calculated thus far, and stops. There are two solutions to this problem; one can either define a less restrictive likelihood function or allow more possible points. The problem with the first is that it allows consideration of less likely paths, while the second solution increases execution time. For the results shown in the next section, the likelihood function was somewhat restrictive, and 175 points were allowed.

Note that if the S wave window increment is decreased in the interests of accuracy, the number of allowable points must be increased proportionately in order to avoid the previously discussed problem of losing possible paths. This is due to the limited range of acceptable values for the $V_p/V_s$ ratio. However, if the number of points is increased by a factor and the S wave window increment is decreased execution time is considerably increased.

The number of likelihood determinations performed at each step of the P-S correlation process is $m^2$ when the number of possible points is m.

In practice, the number of likelihoods actually is reduced in two ways. First, the number of correlation coefficients determined at any given iteration is equal to the number of windows considered along the P trace (this would be "m" for our application.) However, we only consider a maximum of 200 of these as possibilities for new path endpoints. Since we only keep the best 200 paths, the maximum number of likelihoods computed at each iteration is $200^2$. This number may be decreased still further by determining a priori that a path would be physically impossible and so do not calculate an associated likelihood. In fact, this may entirely eliminate further consideration of certain paths at some intermediate points in the process.

The correlation function used in the cross-correlation operation 13 is as follows:

$$\frac{\sum\limits_{j} \text{SIGN}(X_j Y_j)|X_j Y_j|^A 1 - C + C \cdot \frac{\min(X_j, Y_j)}{\max(X_j, Y_j)} \cdot 1 - B + B \frac{\sum\limits_{j}(X_j^2)\sum\limits_{j}(Y_j^2)}{\sum 1}}{\sum\limits_{j}(X_j^2)^A \sum\limits_{j}(Y_j^2)^A}$$

where A, B, and C are user inputs, defined below, and P and S are the P-wave and stretched S-wave data.

A defines the resolution of the correlation function, from 0.0 signifying sign bit, to 1.0 signifying full resolution;

B determines how to weight large amplitude events, from 0.0 to 1.0

C defines the importance of similar amplitude between correlated events, from 0.0 to 1.0.

For the examples in this application, the following values were used for A, B, and C: A=1.0, B=1.0, C=0.0.

The likelihood function is comprised of three parts, as follows:

$C_1 = -10AC = -6(1 - A)(1 - B) \ldots$ if $V_p/V_s$ is very stable $C_2 = 0 \ldots$ if $V_p/V_s$ is moderately stable =

$11(1 - A)(1 - B) \ldots$ if $V_p/V_s$ is not stable $C_3 = 2B(1 - A) - 5.5 \frac{3.3}{\ln(.9/1.8) - \ln V_p/V_{s1.8}}$ Likelihood $= C_1 + C_2 + C_3$ where $C_1$, $C_2$, and $C_3$ are the likelihood associated with the value of the correlation coefficient, stability, or smoothness, of the $V_p/V_s$ ratio, and the value of the $V_p/V_s$ ratio, respectively.

A and B are user inputs as follows:
  A assigns the relative importance of the correlation coefficient in the determination of the likelihood, from 0 to 1
  B assigns the percentage of the remaining weight to be assigned to value of the $V_p/V_s$ ratio (1−A−B) is the percentage of the weight to be assigned to the stability of the $V_p/V_s$ ratio. C is the correlation coefficient determined by the correlation function above.

For the example runs, the following values of A and B were used:

|        | A   | B   |
|--------|-----|-----|
| FIG. 1 | 0.5 | 0.5 |
| FIG. 2 | 1.0 | 0.0 |
| FIG. 3 | 0.5 | 0.0 |
| FIG. 4 | 0.5 | 1.0 |

The invention was tested on seismograms which were chosen as a likely test case because the initial interpretation had led to an incorrect matching of the P and S sections. The correlation was later revised based on the well log data that showed anomalously low $V_p/V_s$ ratios in the area. The problem was to substantially produce the correct match without the benefit of well log information or any special processing.

FIG. 3 shows the paths identifying the best nine $V_p/V_s$ profiles on these seismograms using a simple unnormalized cross-correlation and a likelihood function with relative weights of 50%, 25%, and 25% assigned to the correlation coefficient, $V_p/V_s$ ratio, and smoothness of the path over a 150 millisecond window, respectively. The correlation was performed over traces 85 through 105, with trace 95 of the S-wave section displayed along the bottom and trace 95 of the P-wave data along the left-hand side of FIG. 3. The nine most likely paths are displayed and are numbered 1 through 9 along the top and right. Path number three corresponds to the profile favored by the interpreter given log data and path number one corresponds to the profile most favored by the automated procedure of the invention. The likelihood functions of the nine best paths are as follows:

| 1   | −349 | 4− | −273 | 7− | −247 |
|-----|------|----|------|----|------|
| 2−  | −282 | 5− | −271 | 8− | +5   |
| 3−  | −276 | 6− | −256 | 9− | +253 |

FIGS. 4 through 6 show the results of varying the likelihood function while leaving the correlation function and input seismograms unchanged. In FIG. 4, the correlation coefficient was the only factor considered by the likelihood function. The path most favored in the previous case (FIG. 3) is still the optimal path, while parts of paths 3, 5, and 6 have merged to become a new path number 2. For FIG. 5, a likelihood function was used which put a 50% weight on favoring high correlation coefficients and the remaining 50% toward favoring paths that were smooth over 150 milliseccond windows. The result is that the paths appear to be constructed of line segments. This is an unreasonable likelihood function which violates the assumptions behind the invention and is included only for demonstration purposes. FIG. 6 shows the results of a likelihood function which again put a 50% weight on favoring high correlation, but placed the remaining 50% on maintaining a $V_p/V_s$ of 1.8. While this appears to have worked very well on this data set, it probably is not as reasonable as the likelihood function used for FIG. 3.

FIG. 7 shows the portions of the P and S sections on which the above runs were made, with the P section on the left and the S section on the right. The S section has been stretched according to the number 3 profile from FIG. 3 (the log-based interpretation). FIG. 8 shows the S section stretched according to the number 1 profile from FIG. 3. The only difference is a 110 millisecond time shift between the two matches. The interpreter's log-based match appears to match prominent eye-catching events better, while the match favored by the invention is more subtle and seems to show a better match in areas of poor data quality. In fact, the interpreter's choice agrees with the well log data only slightly better than the profile selected by the invention. Choice number 1 is considered unlikely, however, because it does not match a certain pair of horizons believed to be the Ellenberger formation on the basis of other processing.

The problem of matching shear wave sections to P wave sections is critical in the effective application of shear wave analysis. Previously, interpreters performed this task in a time-consuming and qualitative manner which usually required supporting information such as well log data. The present invention provides an automatic tool which gives good correlation results even in the absence of well log information or sophisticated processing.

While a particular embodiment of the invention has been shown and described, various modifications are within the true spirit and scope of the invention. The appended claims are, therefore, intended to cover all such modifications.

What is claimed is:

1. The method of determining the ratio of the velocities of compressional and shear waves in seismic exploration comprising:
    recording compressional and shear wave seismic traces representing the reflection of seismic energy from subsurface formations;
    cross-correlating a window of one of said compressional and shear wave siesmic traces against a window of the other to produce a first set of correlation coefficients as a function of time;
    time shifting said window through a plurality of time incrments;
    repeating the step of cross-correlating for each of said plurality of time increments to produce a plurality of additional sets of correlation coefficients as a function of time;
    plotting said first and plurality of additional sets of correlation coefficients in parallel columns as a function of time to provide a two dimensional grid, each point on said grid being the correlation coefficient between a point on one trace cf said compressional and shear wave seismic traces and a point on the other of said traces;
    determining a likelihood function along a plurality of paths, said likelihood function representing the correlation coefficients at the points along each of said paths, each of said paths representing different profiles of the ratios of compressional and shear wave velocities; and
    selecting the path having the maximum likelihood function as indicating the correct ratio ofthe velocities of compressional and shear waves.

2. The method recited in claim 1 wherein said likelihood function represents the most likely ratios of compressional and shear wave velocities.

3. The method recited in claim 1 wherein said likelihood function represents the smoothness of the paths through said grid.

4. The method recited in claim 1 wherein the step of selecting the maximum likelihood function is carried out by:
    determining said likelihood function for each sequence of two points along a plurality of different paths;
    selecting a plurality of sequences having high likelihood functions; and
    repeating the steps of determining and selecting for sequences of increasing numbers of points.

5. The method recited in claim 4 wherein the likelihood function is determined for m points wherein $m_2$ sequences of said m points are determined and where m sequences having high likelihood functions are selected.

6. The method recited in claim 1 further comprising:
    stretching the compressional wave seismic traces before cross-correlating by a factor which compensates for differences in the average velocity between compressional and shear waves.

7. The method recited in claim 1 wherein a window of the shear wave trace is cross-correlated against the entire P wave trace to produce correlation coefficients as a function of P wave time, the window in the S wave trace is shifted by an increment of S wave time, and the steps are repeated to produce a grid in which correlation coefficients as a function of P wave time are arrayed against increments of S wave time.

8. The method recited in claim 1 further comprising:
    stretching the shear wave traces in accordance with the correct ratio of the velocities of compressional and shear waves as selected by the path having the maximum likelihood function.

9. The method recited in claim 1 further comprising:
    producing as outputs a plurality of the paths having maximum likelihood functions indicating correct ratios of the velocities of compressional and shear waves.

10. The method recited in claim 1 wherein said likelihood function is a weighted function with weights favoring high correlation coefficients, likely ratios of compressional wave to shear wave velocity, and smooth paths from point to point in said grid.

11. The method of matching compressional and shear wave seismic sections comprising:
    cross correlating a window of one of said compressional and shear wave seismic traces against a window of the other to produce a set of correlation coefficients as a function of time,
    time shifting said window through a plurality of time increments;
    repeating the step of cross-correlating for each of said plurality of time increments to produce a plurality of sets of correlation coefficients as a function of time;
    plotting said sets of correlation coefficients in parallel columns as a function of time to provide a two-dimensional grid, each point on said grid being the correlation coefficient between a point on one of said compressional and shear wave seismic traces and a point on the other of said rtraces;
    determining the cross-correlation coefficients along a plurality of paths in said grid, each of said paths representing different profiles of the ratios of compressional and shear wave velocities;
    selecting the path having the maximum correlation coefficients as indicating the correct ratios of the velocities of compressional and shear waves; and
    adjusting the time scale of the traces in one of the sections in accordance with the correct ratio of the velocities of compressional and shear wave as selected by the path having the maximum cross-correlation coefficients.

12. The method recited in claim 11 further comprising:
    determining a likelihood function for each point in said grid representing said cross-correlation coefficients, the smoothness of the paths through said grid and the most likely ratios of compressional and shear wave velocity.

13. The method recited in claim 12 wherein the step of selecting the path includes:
   selecting the path having the maximum likelihood functions.

14. The method recited in claim 13 wherein the step of selecting the maximum likelihood function is carried out by:
   determining said likelihood function for each sequence of two points along a plurality of different paths;
   selecting a plurality of sequences having high likelihood functions; and
   repeating the steps of determining and selecting for sequences of increasing numbers of points.

15. The method recited in claim 11 further comprising:
   recording compressional and shear wave seismic traces representing the reflection of seismic energy from subsurface formations;
   cross-correlating a window of one of said compressional and shear wave seismic traces against a window of the other to produce a set of correlation coefficients as a function of time;
   time shifting said one window an increment of time;
   repeating the steps of cross-correlating and shifting said window to form said grid of said correlation coefficients, one set of coefficients as a function of time being formed for each said increment of time, the correlation coefficient between a point on one trace and a point on the other being represented by a point on said grid.

16. The method recited in claim 15 further comprising:
   stretching the compressional wave seismic traces before cross-correlating by a factor which compensates for differences in the average velocity between compressional and shear waves.

17. The method recited in claim 15 wherein a window of the shear wave trace is cross-correlated against the entire P wave trace to produce correlation coefficients as a function of P wave time, shifting the window in the S wave trace by an increment of S wave time, and repeating the foregoing steps to produce said grid in which correlation coefficients as a function of P wave time are arrayed against increments of S wave time.

18. The method recited in claim 12 further comprising:
   producing as outputs a plurality of the paths having maximum likelihood functions indicating correct ratios of the velocities of compressional and shear waves.

19. The method recited in claim 11 wherein the step of adjusting the time scale includes stretching the time scale of the shear wave traces in accordance with said correct ratio.

20. The method of adjusting the time scales of compressional an shear wave sections comprising:
   cross correlating a window of one of said compressional and shear wave seismic traces against a window of the other to produce a set of correlation coefficients as function of time,
   time shifting said window through a plurality of time increments;
   repeating the step of cross-correlating for each of said plurality of time increments to produce a plurality of sets of correlation coefficients as a function of time;
   plotting said sets of correlation coefficients in parallel columns as a function of time to provide a two-dimensional grid, each point on said grid being the correlation coefficient between a point on one of said compressional and shear wave seismic traces and a point on the other of said traces;
   determining the cross-correlation coefficients along a plurality of paths in said grid, each of said paths representing different profiles of the ratios of compressional and shear wave velocities;
   selecting the path having the maximum correlation coefficients as indicting the correct ratios of the velocities of compressional and shear waves; and
   stretching the shear wave traces in the section in accordance with the correct ratio of the velocities of compressional and shear waves as selected by the path having the maximum cross-correlation coefficients.

* * * * *